Nov. 24, 1959     O. H. BANKER     2,914,035
OPEN CENTER VALVE WITH LIMITED REACTION
Filed April 29, 1957
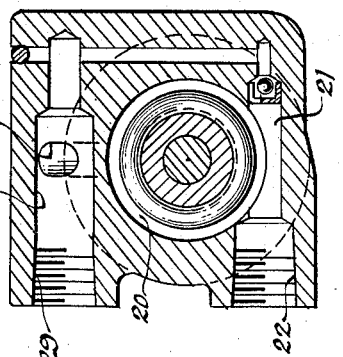
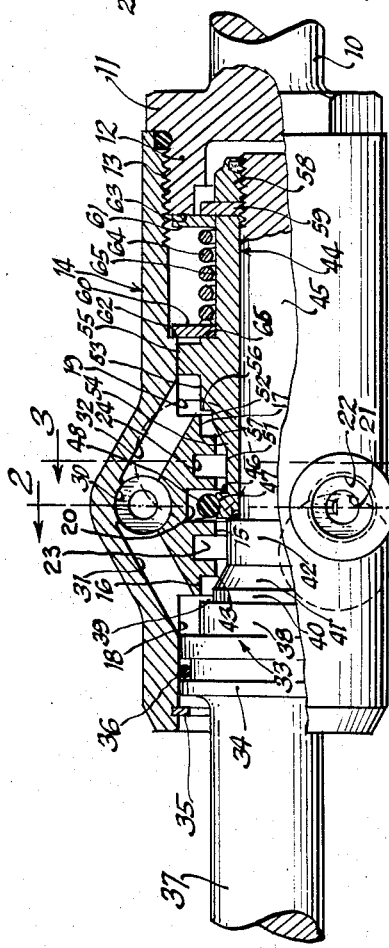
INVENTOR.
Oscar H. Banker
BY
Charles J. Vytech
Attorney

2,914,035

OPEN CENTER VALVE WITH LIMITED REACTION

Oscar H. Banker, Evanston, Ill., assignor to New Products Corporation, Skokie, Ill., a corporation of Delaware Application April 29, 1957, Serial No. 655,741

10 Claims. (Cl. 121—46.5)

This invention relates to valves for controlling the operation of double-acting pressure differential operated devices and is particularly well adapted for use in controlling power steering mechanisms. For purposes of illustration it will be described with reference to a valve of the type disclosed and claimed broadly in my copending application Serial No. 565,176, filed February 13, 1956, now Patent No. 2,879,748. The invention may be applied generally, however, to valves commonly referred to as "open center" valves.

In a power steered vehicle wherein the effort required to turn the steering wheels is largely supplied by a hydraulic cylinder, it is desirable that the driver have as much road "feel" as possible so that he can sense to some degree the angularity of the steered wheel as well as any unusual force tending to resist turning of the wheel. Where open center valves of the type hereinabove referred to are used, it is customary to build into the valve an unbalanced area subjected to the fluid pressure tending to turn the wheel, the area in turn being mechanically connected in suitable fashion to the steering wheel held by the driver. This area may be termed the "reaction" area, and it has been found that when the area is large enough to give the desirable road feel, it produces too much resistance when the wheel is turned through a large angular distance when parking the vehicle at the curb. This results from the fact that more effort is required to turn the wheels when the vehicle is either not moving, or is moving at very low speeds, than when the vehicle is moving forward at ordinary driving speeds.

The object of this invention is to provide a valve of the open center type, particularly for use in power steering mechanisms, which provides a large reaction area to give good road feel at ordinary driving speeds but which will provide a very low reaction pressure or feel, and hence very little resistance to turning a steering wheel, when the vehicle is either stationary or is moving at extremely low speeds.

As a more specific object, this invention seeks to provide an open center type of valve particularly adapted for power steering purposes which will produce a limited reaction in the manually controlled portion thereof, without requiring the addition of parts to valves such as those already in existence.

A further object is the provision of an open center valve having a limited reaction pressure on the manually controlled portion thereof without materially increasing the cost thereof.

These and other objects of this invention will become apparent from the following detailed description when taken together with the accompanying drawings in which, Fig. 1 is a quarter sectional view through a valve incorporating the features of this invention;

Fig. 2 is a cross section through the valve of Fig. 1 taken along line 2—2 thereof and looking in the direction of the arrows at the ends of said line;

Fig. 3 is another cross sectional view of the valve of Fig. 1 taken along line 3—3 and in the direction of the arrows intersecting said line;

Fig. 4 is a fragmentary quarter sectional view of the valve showing it in an intermediate stage of its operation; and Fig. 5 is a fragmentary quarter sectional view of the valve of Fig. 1 showing it in a final stage of operation.

The form of valve chosen to illustrate this invention in Figs. 1 to 5 is basically the same as that disclosed and claimed broadly in my copending application Serial No. 565,176, filed February 13, 1956, now Patent No. 2,879,748. As in said prior application, the present form is shown as it might be constructed for use in a power steering mechanism for a vehicle of either the road or earth working types.

Referring to Fig. 1 for a detailed description of the invention there is shown the end of a rod 10, which may be a part of what is known as a "drag" link in a vehicle steering mechanism and is manually reciprocated by any suitable mechanism (not shown) which may include a steering wheel, lever or the like. Said rod end 10 has a radially extending flange 11 and an axially extending flange 12, the outer periphery of the latter being threaded as at 13 to receive the internally threaded end of a valve housing 14. Said housing 14 is formed with a bore 15 terminating in short counterbores 16 and 17, which, in turn, terminate in second counterbores 18 and 19, respectively.

Substantially midway between the ends of bore 15 in housing 14 is a peripheral groove 20 intercepted by a cross bore 21 (Fig. 2) so as to be in hydraulic communication therewith, said cross bore 21 terminating in a threaded opening 22 connectible to a source of fluid under pressure (not shown). Thus, groove 20 constitutes the inlet groove for the valve. Axially spaced on either side of inlet groove 20 are outlet grooves 23 and 24 which, as shown more clearly in Fig. 3 with respect to groove 24, are connected through suitable cored openings 25 and 26 to threaded outlet openings 27 and 28, respectively. It is contemplated that opening 27 will be connected to one end of the double acting hydraulic piston or motor (not shown) and threaded opening 28 will be connected to the opposite end of said cylinder. Said outlet grooves 23 and 24 are vented through a threaded opening 29 (Fig. 2) connected to a cross bore 30 which intersects angularly disposed passages 31 and 32 opening into counterbores 18 and 19, respectively, which, in turn, are connected to grooves 23 and 24 in a manner hereinafter to be described.

Within housing 14 is an oscillatable valve designated generally by the reference character 33 which may comprise, in the form chosen to illustrate this invention, a guide 34 reciprocable in counterbore 18 and retained therein by a snap ring 35. Said guide 34 is preferably sealed with respect to counterbore 18 by any suitable means such as a conventional elastomeric O-ring 36. Guide 34 may be made an integral part of a further extension 37 of the rod 10, said extension 37 being connected through suitable means (not shown) to the load to be moved, in this case the steering wheels of the vehicle. It is understood, however, that extension 37 may be made as a separate part and attached to valve 33 by any suitable means.

Adjacent guide 34 on valve 33 is a step 38 forming a shoulder 39 with a second step 40, said second step 40 being connected by a tapered section 41 to a third step 42. It is contemplated that step 38 will, during the functioning of the valve, be telescoped into counterbore 16. The diameter of step 38 is smaller than the diameter of counterbore 16 to provide a loose fit therebetween and thus to create in effect an orifice which progressively restricts flow therebetween as the step enters counterbore 16. For a given desired reaction the difference in the diameters of the step and bore is calculated from the rate of flow produced by the pump used to supply fluid under pressure to the valve, and increases with such rate of flow. For a given installation, however, this flow is usually made constant by a suitable regulator (not shown) and hence is independent of pump speed. By assuming some reaction pressure as being satisfactory and determining the area of step 38 available or desirable in the valve, the maximum unit pressure available and rate of flow of the system are determined and these quantities are then used in the equation for determining the internal and external diameters of the annular orifice required to produce the necessary unit pressure against step 38. In one example, the difference in diameters for a flow rate of two gallons per minute at a maximum pressure of 250 p.s.i. was 0.008 inch to produce a desirable reaction with an available step area of 0.5 square inch. Step 40 is larger in diameter than bore 15 so that the corner 43, formed by bore 15 and the radially extending bottom of counterbore 16, contacts tapered section 41 and constitutes in effect a valve seat, with tapered section 41 functioning as a valve, to shut off fluid communication between bore 15 and counterbore 16. The third step 42 is of considerably reduced diameter with respect to the diameter of bore 15 to provide a passage between the valve and bore 15 through which fluid may flow in an axial direction.

Due to the spool-like shape of valve 33, as will be made apparent presently, said valve 33 is made of two parts, the first part including guide 34 and steps 38, 40 and 42, and the second part 44 comprising a sleeve mounted on a rod 45 of reduced diameter with respect to third step 42 and preferably made integral with guide 34 and the intermediate steps 38, 40 and 42. Said sleeve 44 has formed on the left hand end thereof as viewed in Fig. 1 a small radially extending flange 46 which is of less axial extent than the axial dimension of inlet groove 20. The outer periphery of flange 46 is formed with a shallow groove 47 in which is stretched an endless ring 48, preferably an O-ring made of resilient deformable material such as one of the elastomers (rubber, synthetic or natural, or a combination of the two), said ring having an axial length or thickness which is likewise less than the axial dimension of groove 20. The shallow groove 47 does not extend completely across the periphery of flange 46 so that short sections 49 and 50 (Figs. 4 and 5) of cylindrical contour remain on either side of ring 48. The outside diameter of these short sections 49 and 50 is substantially the same as the diameter of bore 15, but it is not necessary to lap the surfaces of these sections and the bore 15 to provide a fluid tight fit therebetween since such sections are not required to function as primarily valves in the construction herein described.

Adjacent flange 46 and extending to the right thereof as viewed in Fig. 1 are the counterparts of the steps 42, 40 and 38, said counterparts being designated 51, 52 and 53, respectively. The counterpart for tapered section 41 is designated 54, and the counterpart for guide 34 is designated 55; the shoulder corresponding to shoulder 39 is shown at 56, and the corner corresponding to corner 43 is shown at 57.

Valve part 44 is retained on rod 45 by a nut 58 threaded on the end of rod 45 and holding valve part 44 against step 42 through a washer 59, the function of which will be described presently.

The valve hereinabove described is of the open center type and accordingly the various parts of the valve 33 are so proportioned with respect to the adjacent parts of housing 14 as to provide an unobstructed path from inlet groove 20 to the outlet passages 31 and 32 when valve 33 is centered in housing 14 as shown in Fig. 1. Under these conditions no pressure is built up in outlet grooves 23 and 24 and hence no external power is applied to the steering mechanism to move it in either direction. This centered or neutral position is normally established for valve 33 by the usual mechanism comprising spaced washers 60 and 61 operating at their outer peripheries against abutments 62 in valve housing 14 and the end 63 of axially extending flange 12 and held in such abutting relation with respect to abutment 62 and end 63 by a compressed spring 64. Valve part 44 is of reduced diameter at 65 and forms a shoulder 66 against which the inner region of washer 60 bears. Previously described washer 59 is of greater diameter than the inner diameter of washer 61 so that the latter bears at its radially inner regions against said washer 59. The relative axial positions of the shoulders 62 and 66 are such that when they are aligned by washer 60, the valve 33 is centered with respect to the various grooves in housing 14 to provide the neutral position shown in Fig. 1.

The operation of the valve is as follows:

Considering first the condition of the valve shown in Fig. 1, it is assumed that there is no manual pressure being exerted on rod 10, either to the left or to the right, as shown in this figure. Under these conditions, fluid entering groove 20 from inlet opening 22 and cross bore 21 flows around O-ring 48, the opposite sides of flange 46, between bore 15 and steps 42 and 51, along tapered sections 41 and 54, past corners 43 and 57 respectively, radially outwardly around shoulders 39 and 56 into the counterbores 18 and 19, and thence along passages 31 and 32 into cross bore 30 and vent opening 29.

Assuming next that pressure is exerted upon rod 10 by the operator of the vehicle to the left as viewed in Figs. 1, 4 and 5, the valve and housing may assume the relative positions shown in Fig. 4. In this position it will be noted that short section 49 of flange 46 has entered counterbore 15 and O-ring 48 has contacted the radially disposed side of groove 20. O-ring 48 therefore seals off bore 15 from the fluid under pressure in inlet groove 20 and furthermore, said pressure is applied to the side of O-ring 48 to urge it still more firmly against the side of groove 20 to insure a perfect seal therebetween. Step 53 has just entered counterbore 17 and inasmuch as step 53 is from .005 to .008 inch smaller in diameter than the diameter of counterbore 17, the flow of fluid into counterbore 19 still continues, but at a reduced rate. It may be noted that corner 57 has not yet been contacted by tapered valve section 54 so that flow is still possible between these two valve elements. With the presence of fluid under pressure in counterbore 17, a pressure will be built up against shoulder 56 tending to urge valve 33 back to its neutral position. This reaction pressure is transmitted back to rod 10 through valve part 44 (Fig. 1), washer 60, spring 64, washer 61, and flanges 12 and 11. The greater the restriction of flow past shoulder 56 the greater the reaction will become. Thus, during this range of movement of the valve 33 in housing 14, that is, the range in which flow past corner 57 is still possible, the greater the resistance to movement produced by the load (vehicle wheels) the greater will be the reaction transmitted back to rod 10 and to the operator's hands so that he can feel this resistance in much the same manner as the driver of a vehicle not equipped with power steering.

Should the load resistance exceed a predetermined amount as determined by spring 64 so that housing 14 is pulled to the right as viewed in Fig. 1 to substantially the position shown in Fig. 5, corner 57 will contact tapered section 54, that is to say, tapered valve element 54 will seat upon corner 57 and fluid will cease flowing into counterbore 17, thereby eliminating any reaction pressure on shoulder 56. The only resistance felt by the operator beyond this point is that produced by the resistance of spring 64 to compression. Thus, if the vehicle is either standing still or moving very slowly so that resistance to steering movement of the vehicle wheels is at its greatest value, the effort to turn the wheels experienced by the vehicle driver is less than the maximum reaction felt during normal driving and becomes constant irrespective of variations in the actual force required to move the wheels. In short, less effort is required to park the vehicle than is required at times to steer the vehicle while it is in normal turning movement.

In view of the symmetrical arrangement of the valve 33 with respect to housing 14 the identical sequence of operation takes place when the valve housing is moved to the left as viewed in Fig. 1 with respect to the valve 33 to close groove 24 to fluid pressure and to close vent passage 31, first, in part by step 38 entering counterbore 16 and, finally, by tapered valve element 41 seating upon corner 43.

The valve described above has been shown as being symmetrical with respect to the inlet opening so that the reaction produced on one side is the same as that produced on the other. It is understood, however, that where the two sides of the piston controlled by the valve are not equal, corresponding inequality may be built into the valve to compensate for this and produce a net reaction which is the same on both sides. It may also be readily appreciated that bore 15 may be enlarged at corner 43 or corner 57 or both to produce an unbalanced pressure on the valve and a reaction against the steering rod 10 when flow past said corners is cut off if the complete lack of reaction when parking is found to be undesirable.

It is apparent that the valve construction hereinabove described may be applied to any double acting work cylinder where it is desired to allow the operator to retain some of the feel of the load as it varies from minimum to maximum, while at the same time limiting this reaction to a predetermined relatively nominal value under extreme conditions. It is therefore understood that the foregoing description is merely illustrative of a preferred embodiment of this invention and that the scope of this invention is not to be limited thereto but is to be determined by the appended claims.

I claim:

1. A valve comprising a manually reciprocable element, an element reciprocable with a load, one of said elements having a bore therein and the other of said elements being reciprocable in said bore, the said one element having disposed in sequential axial arrangement therein a vent opening, an inlet opening for fluid under pressure, and a second vent opening; said other element having means for closing the first vent opening and means for closing the second vent opening, said means for closing the second vent opening including opposed radially disposed effective areas on the elements for producing a fluid pressure reaction tending to open the second vent and including also cooperating valve means for cutting off fluid pressure to said radially disposed effective areas upon further movement of the closing means in a direction to close the second vent opening.

2. A valve comprising a manually reciprocable element, an element reciprocable with a load, one of said elements having a bore therein and the other of said elements being reciprocable in said bore, the said one element having disposed in sequential axial arrangement therein a vent opening, an inlet opening for fluid under pressure, an outlet opening in communication with the inlet opening and a second vent opening; said other element having disposed in axial arrangement therein first and second means for closing and restricting the first and second vent openings respectively to produce operating pressures in the outlet opening, cooperating step means on the elements for producing a pressure tending to open the second vent opening, and other cooperating means on the valve elements for cutting off the fluid pressure to the step means upon further movement of the closing means in a direction to close the second vent opening.

3. A valve as described in claim 2, the cooperating step means on the elements comprising a counterbore in the one element and a shoulder on the other element adapted to enter the counterbore with a loose fit to restrict flow to the second vent opening as aforesaid.

4. A valve as described in claim 2, the other cooperating means on the elements for cutting off the fluid pressure to the step means comprising a tapered section on the other element, said one element having a counterbore forming a valve seat for the tapered section.

5. A valve as described in claim 2, the cooperating step means on the elements comprising a counterbore in the one element and a shoulder on the other element adapted to enter the counterbore with a loose fit to restrict flow to the second vent opening as aforesaid, the restriction being progressively greater as the shoulder enters farther into the counterbore, and the other cooperating means on the elements for cutting off the fluid pressure to the step means comprising a tapered section on the other element, said counterbore forming a valve seat for the tapered section.

6. A valve as described in claim 5, wherein the other cooperating means is disposed between the fluid inlet and the second vent means.

7. A valve comprising a manually reciprocable element, an element reciprocable with a load, one of said elements having a bore therein and the other of said elements being reciprocable in said bore, the said one element having an inlet opening and axially arranged on either side thereof an outlet opening and a vent opening, and the other of said elements having thereon a control valve element and spaced valve elements, the latter adapted to close said vent openings, said spaced valve elements each including opposed radially disposed effective areas on the elements for producing a fluid pressure reaction tending to open the second vent and including also cooperating valve means for cutting off fluid pressure to said radially disposed effective areas upon further movement of the valve elements in a direction to close the second vent opening.

8. A valve as described in claim 7, said opposed radially disposed effective areas on the elements comprising a counterbore in the said one element and a shoulder on the other element adapted to enter the counterbore with a loose fit to restrict flow to a vent opening, the restriction being progressively greater as the shoulder enters farther into the counterbore.

9. A valve as described in claim 7, said opposed radially disposed effective areas on the elements comprising a counterbore in the said one element and a shoulder on the other element adapted to enter the counterbore with a loose fit to restrict flow to a vent opening, the restriction being progressively greater as the shoulder enters farther into the counterbore, and the valve means for cutting off fluid pressure to said radially disposed effective areas comprising a tapered section on the other element, said counterbore forming a valve seat for the tapered section.

10. A valve comprising a housing having a central bore, first counterbores at the ends of the bore and second counterbores at the ends of the first counterbores, a central inlet groove in the bore, outlet grooves one axially spaced from the inlet groove and on either side thereof, and vent openings leading from the second counterbores; a valve reciprocable in the valve bore and having an axially movable valve element received in the inlet groove, a groove in the valve on either side of the valve element and adapted to establish communication between the inlet groove, the outlet groove and the first counterbore, said valve element when axially moved into sealing contact with the wall of the inlet groove cutting off flow to one of the outlet grooves, said valve having further spaced opposed shoulders adapted mutually exclusively to enter the first counterbores with a loose fit to progressively restrict flow through the said first counterbores as the shoulders enter the counterbores, and a second valve element disposed intermediate an outlet groove and a counterbore to shut off flow to the shoulder after the shoulder has entered a counterbore a predetermined amount.

References Cited in the file of this patent

UNITED STATES PATENTS

| | | |
|---|---|---|
| 2,702,529 | Doerfner | Feb. 22, 1955 |
| 2,788,770 | Folkerts | Apr. 16, 1957 |
| 2,798,461 | Gold et al. | July 9, 1957 |